(12) United States Patent
Su et al.

(10) Patent No.: US 12,050,639 B2
(45) Date of Patent: Jul. 30, 2024

(54) METHOD AND SYSTEM FOR SKETCH BASED SEARCH

(71) Applicant: YAHOO ASSETS LLC, Dulles, VA (US)

(72) Inventors: Wei-Lun Su, Yi-Lan County (TW); Wen-Hsuan Wu, Taipei (TW); Ching-Han Chang, Taipei (TW); Tzu-Chiang Liou, New Taipei (TW)

(73) Assignee: YAHOO ASSETS LLC, Dulles, VA (US)

( * ) Notice: Subject to any disclaimer, the term of this patent is extended or adjusted under 35 U.S.C. 154(b) by 591 days.

(21) Appl. No.: 16/681,223

(22) Filed: Nov. 12, 2019

(65) Prior Publication Data

US 2021/0141825 A1 May 13, 2021

(51) Int. Cl.
| | | |
|---|---|---|
| *G06F 16/53* | (2019.01) | |
| *G06F 16/903* | (2019.01) | |
| *G06N 3/045* | (2023.01) | |
| *G06N 3/08* | (2023.01) | |
| *G06N 20/20* | (2019.01) | |
| *G06T 11/20* | (2006.01) | |
| *G06T 11/60* | (2006.01) | |

(52) U.S. Cl.
CPC ........ *G06F 16/53* (2019.01); *G06F 16/90335* (2019.01); *G06N 3/045* (2023.01); *G06N 3/08* (2013.01); *G06N 20/20* (2019.01); *G06T 11/203* (2013.01); *G06T 11/60* (2013.01)

(58) Field of Classification Search
CPC ... G06F 16/53; G06F 16/90335; G06N 20/20; G06N 3/0454; G06N 3/08; G06T 11/203; G06T 11/60

USPC ......................................................... 707/736
See application file for complete search history.

(56) References Cited

U.S. PATENT DOCUMENTS

| | | | |
|---|---|---|---|
| 10,248,664 B1* | 4/2019 | Shen | G06N 5/046 |
| 11,073,975 B1* | 7/2021 | Mueller | G06F 3/04847 |
| 2011/0302522 A1* | 12/2011 | Cao | G06F 16/532 707/E17.014 |
| 2012/0054177 A1* | 3/2012 | Wang | G06F 16/5854 707/723 |
| 2017/0262479 A1* | 9/2017 | Chester | G06F 16/54 |
| 2018/0247201 A1* | 8/2018 | Liu | G06T 1/00 |
| 2019/0049540 A1* | 2/2019 | Odry | G01R 33/543 |
| 2019/0188534 A1* | 6/2019 | Murrish | G06N 3/08 |
| 2020/0073968 A1* | 3/2020 | Zhang | G06F 16/137 |
| 2021/0064858 A1* | 3/2021 | Batra | G06N 3/08 |

(Continued)

OTHER PUBLICATIONS

Ghosh et al, "Interactive Sketch & Fill: Multiclass Sketch-to-Image Translation", Sep. 25, 2019, arXiv:1909.11081v2 (Year: 2019).*

(Continued)

*Primary Examiner* — Hosain T Alam
*Assistant Examiner* — Robert F May
(74) *Attorney, Agent, or Firm* — Venable LLP

(57) ABSTRACT

The present teaching relates to a method, system, and programming for searching content. A sketch of an object is obtained from a user. The sketch is processed by a neural network to generate an image corresponding to the sketch of the object. One or more features are extracted from the image, and one or more images previously stored are identified that have features similar to the one or more features. The one or more images are provided to the user.

20 Claims, 11 Drawing Sheets

(56) References Cited

U.S. PATENT DOCUMENTS

2021/0263963 A1* 8/2021 Cho .................. G06T 11/203
2022/0044352 A1* 2/2022 Liao .................. G06F 18/2135

OTHER PUBLICATIONS

Huang et al., "Multimodal Unsupervised Image-to-Image Translation", Aug. 14, 2018, arXiv:1804.04732v2 (Year: 2018).*

* cited by examiner

METHOD AND SYSTEM FOR SKETCH BASED SEARCH

BACKGROUND

1. Technical Field

The present teaching generally relates to methods, systems, and programming for information retrieval. Particularly, the present teaching is directed to methods, systems and programming for searching content based on a hand drawn sketch.

2. Technical Background

The Internet has made it possible for a person to electronically access virtually any content at any time and from any location. The Internet technology facilitates information publishing, information sharing, and data exchange in various spaces and among different persons. Typically, users issue a search query to a search engine to obtain desirable content. A search engine is one type of information retrieval system that is designed to help users search for and obtain access to information that is stored in a computer system or across a network of computers. In response to a query from a user, the search engine can search different content providers online to obtain search results matching the query. Content providers can be a publisher, a content portal, or any other sources from which content can be obtained.

Traditional searching mechanisms include a keyword based search and an image based search. In keyword based search, a user issues a query to the search engine via one or more keywords. The keywords correspond to content that is desirable to the user. For instance, in an e-commerce scenario, if the user is interested in viewing/purchasing handbags, then the user may issue a query using keywords such as handbag, tote, brown handbag, etc. The search engine uses these keywords to provide the user with information related to relevant handbags. In an image based search, the user submits as a query, an image of the product that the user is interested in. The search engine utilizes the image to search various content sources to obtain information pertaining to the product or other related (i.e., similar) products.

In the above described search mechanisms, it is assumed that the user is either able to formulate the appropriate keywords that describe the product or obtain a clear image of the product that the user desires. However, this may not always be the case. For instance, the user may not be able to describe in words (e.g., due to a lack of language proficiency), specific characteristics (e.g., shape, style, etc.,) of the product. In a similar manner, there may be instances where the user may not be able to capture an image of the product. For example, if the user views a product in a government organization e.g., a museum, the user may be restricted due to organization policies to use a camera to capture an image of the product. In such scenarios the traditional searching mechanisms will not be helpful for the user. Accordingly, there is a need to devise a solution to address the above stated problems.

SUMMARY

The teachings disclosed herein relate methods, systems, and programming for information retrieval. Particularly, the present teaching is directed to methods, systems and programming for searching content based on a hand drawn sketch.

One aspect of the present disclosure provides for a method, implemented on a machine having at least one processor, storage, and a communication platform capable of connecting to a network for searching content. The method comprises the steps of: obtaining a sketch of an object from a user; generating, via a neural network, an image corresponding to the sketch of the object; extracting one or more features from the image; identifying one or more images previously stored that have features similar to the one or more features; and providing the one or more images to the user.

By one aspect of the present disclosure, there is provided a system for searching content. The system comprises a neural network implemented by a processor and configured to obtain a sketch of an object from a user, and generate an image corresponding to the sketch of the object. A feature extractor implemented by the processor and configured to extract one or more features from the image, and a processing unit implemented by the processor and configured to identify one or more images previously stored that have features similar to the one or more features and provide the one or more images to the user.

Other concepts relate to software for implementing the present teaching. A software product, in accord with this concept, includes at least one machine-readable non-transitory medium and information carried by the medium. The information carried by the medium may be executable program code data, parameters in association with the executable program code, and/or information related to a user, a request, content, or other additional information.

In one example, there is provided, a machine readable and non-transitory medium having information recorded thereon for searching content, wherein the information, when read by the machine, causes the machine to perform the steps of: obtaining a sketch of an object from a user; generating, via a neural network, an image corresponding to the sketch of the object; extracting one or more features from the image; identifying one or more images previously stored that have features similar to the one or more features; and providing the one or more images to the user.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
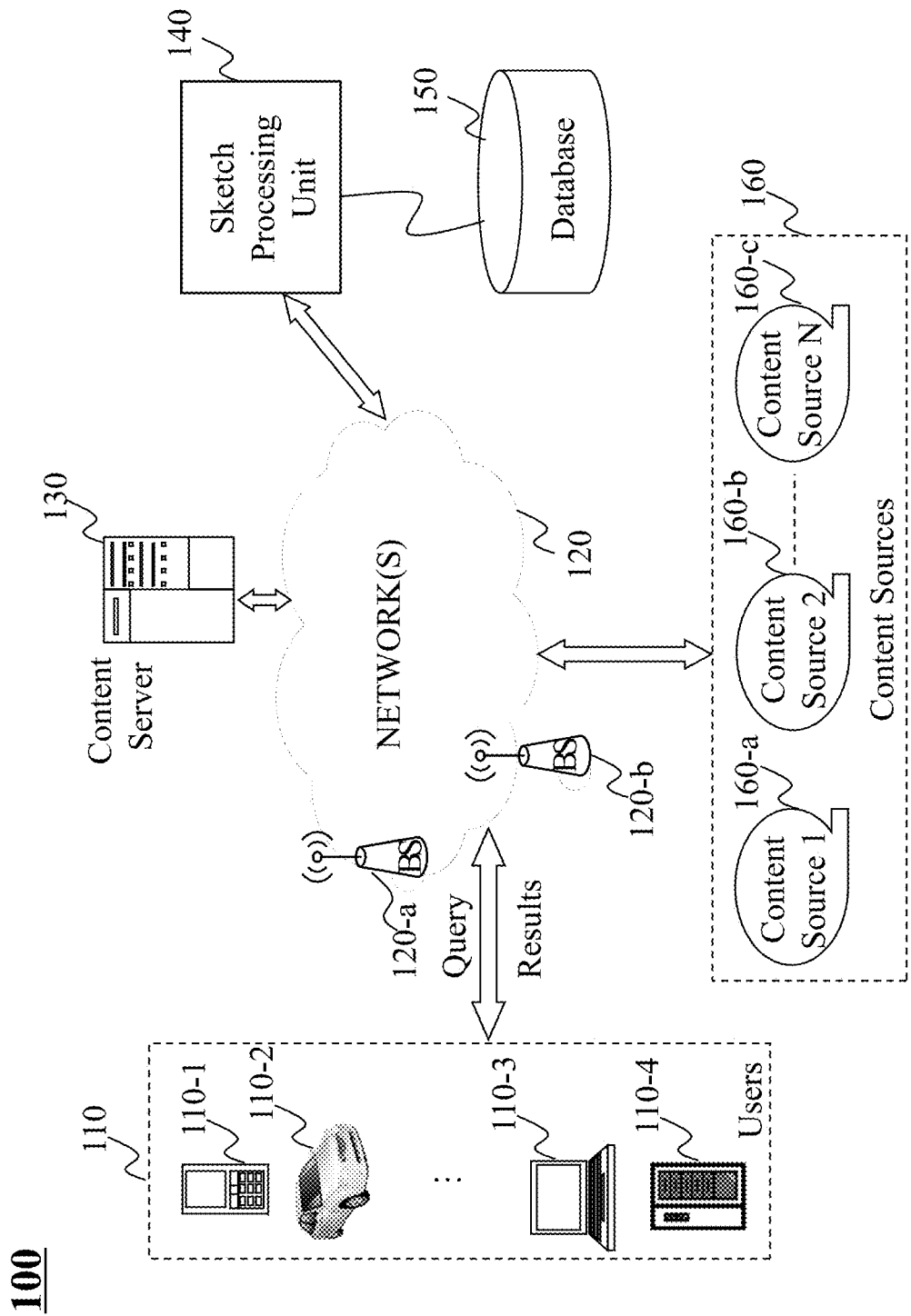
FIG. 1 illustrates an exemplary system configuration in which a sketch processing unit can be deployed, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein. Example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Furthermore, the term 'hand-drawn sketch' is referred to as a 'sketch' and corresponds to a hand drawing of an object by a user(s) in a graphical user interface.

FIG. 1 illustrates an exemplary system configuration in which a sketch processing unit 140 can be deployed in accordance with various embodiments of the present teaching. In the configuration 100 depicted in FIG. 1, the sketch processing unit 140 is directly connected to a network 120 and operates as an independent service on the network. In FIG. 1, the exemplary system 100 includes users 110, a network 120, a content server 130, the sketch processing unit 140, a database 150, and one or more content sources 160, including content source 1 160-a, content source 2 160-b, . . . , and content source N 160-c.

The network 120 may be a single network or a combination of different networks. For example, a network may be a local area network (LAN), a wide area network (WAN), a public network, a private network, a proprietary network, a Public Telephone Switched Network (PSTN), the Internet, a wireless network, a cellular network, a virtual network, or any combination thereof. A network may also include various network access points, e.g., wired or wireless access points such as base stations or Internet exchange points 120-a, . . . , 120-b, through which a data source may connect to the network 120 in order to transmit information via the network and a network node may connect to the network 120 in order to receive information. In one embodiment, the network 120 may be a content distribution network, which connects users 110 to the content server 130 and the sketch processing unit 140, which provide the users with relevant content obtained from the content sources 160.

Users 110 may be of different types such as users connected to the network via desktop connections (110-4), users connecting to the network via wireless connections such as through a laptop (110-3), a handheld device (110-1), or a built-in device in a motor vehicle (110-2). A user may send a query to the content server 130 or the sketch processing unit 140 via the network 120 and receive a corresponding search result through the network 120. By one embodiment, a user's query of the type which includes a keyword or an image captured by an imaging device (e.g., camera) may be directed to the content server 130. Alternatively, if the user's query is a sketch (i.e., a hand drawn image of an object), the query may be directed to the sketch processing unit 140. Accordingly, the user's query may be handled by either the content server 130 or the sketch processing unit 140, both of which may search for relevant content, based on the query, from the content sources 160.

Content sources 160, may correspond to an entity, whether an individual, a firm, or an organization, publishing or supplying content, including a blogger, television station, a newspaper issuer, a web page host, a content portal, an online service provider, or a game server. For example, in connection to an online or mobile ad network, content source 160 may be an organization such as CNN.com, a content portal such as YouTube and Yahoo.com, or a content-soliciting/feeding source such as Twitter or blogs.

By one embodiment, the user 110 may draw a sketch of an object (i.e., a hand drawn sketch) using a graphical user interface associated with the device that is being operated by the user. Alternatively, the user can install a drawing application (i.e., an 'app') on his/her device and use the application to draw the hand-drawn sketch. The hand drawn sketch is transmitted to the sketch processing unit 140 for further processing. In what follows, there is provided a detailed description of the processing performed by the sketch processing unit 140. The relevant content (with respect to the query i.e., the hand drawn sketch) obtained by the sketch processing unit 140 is transmitted back to the user as a response (i.e., results) to the query, and also may be stored for future use in a database 150. The results may be rendered on a webpage(s) that is/are viewed on the device operated by the user.

Figure 2:
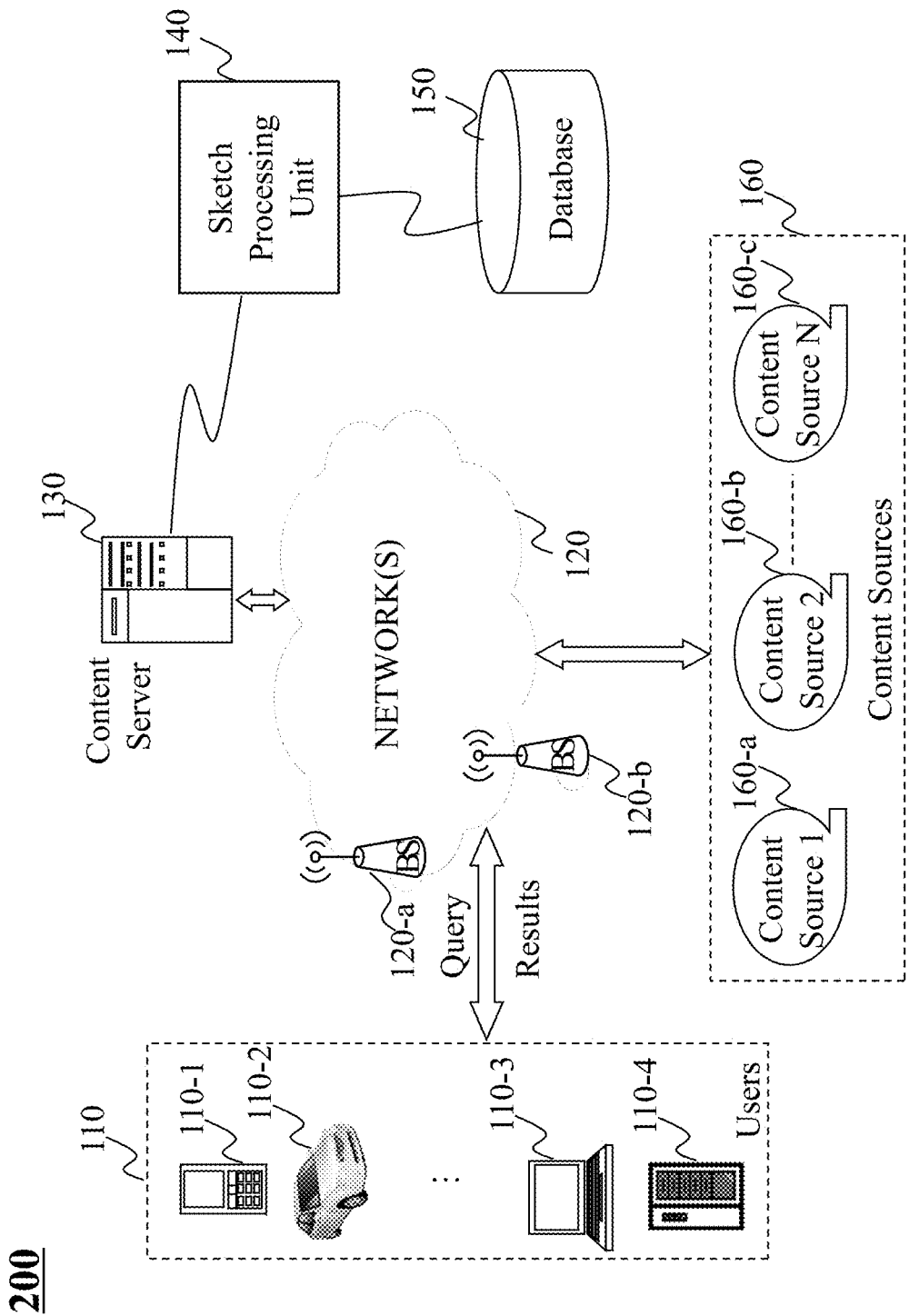
FIG. 2 illustrates another exemplary system configuration in which a sketch processing unit can be deployed, according to an embodiment of the present teaching.

As stated previously, the embodiment illustrated in FIG. 1 includes the sketch processing unit 140 operating as an independent service (i.e., a standalone service) on the network 120. In FIG. 2, an alternate configuration is provided, wherein the sketch processing unit 140 operates as a special module in the backend of the content server 130. When there are multiple content servers (not shown), each may have its own backend module for sketch processing purposes. Nonetheless, it must be appreciated that the sketch processing unit 140 as shown in FIG. 2 performs functions similar to those described above with reference to FIG. 1.

Figure 3:
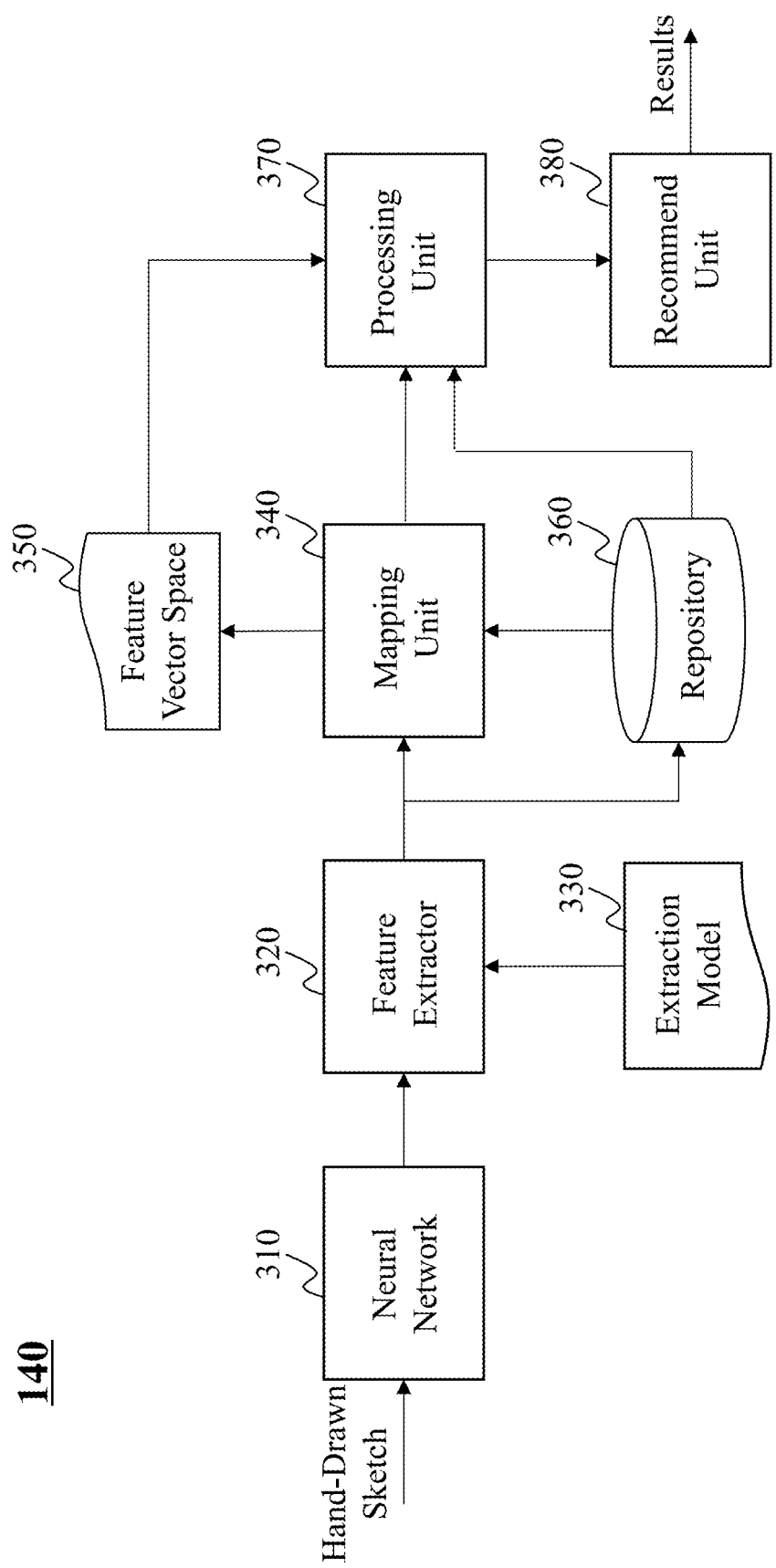
FIG. 3 depicts an exemplary system diagram of a sketch processing unit, according to various embodiments of the present teaching.

FIG. 3 depicts an exemplary system diagram of a sketch processing unit 140, according to various embodiments of the present teaching. The sketch processing unit 140 includes a neural network 310, a feature extractor 320, a mapping unit 340, a processing unit 370, and a recommend unit 380. The neural network 310 receives as input, a hand-drawn sketch of an object from a user. By one embodiment, the neural network 310 is a conditional generative adversarial network (cGAN). Details regarding the cGAN are described later with reference to FIG. 5. The neural network 310 is configured to receive the hand-drawn sketch of an object and generate an image that corresponds to the hand-drawn sketch. In other words, the neural network receives a rough sketch i.e., a hand-drawn sketch of an object and generates a real world image of the object (also referred to herein as a rendered image).

The rendered image is transmitted to the feature extractor 320. The feature extractor 320 is configured to extract one or more features from the rendered image of the object in accordance with an extraction model 330 in order to generate a feature vector. It must be appreciated that the extracted features may correspond to characteristics features pertaining to size, shape, color, texture, etc., of the object. The extracted features may be stored in a repository 360. The mapping unit 340 maps the generated feature vector in a feature-vector space 350.

The processing unit 370 is configured to identify one or more images previously stored that have features similar to the one or more features. Specifically, the processing unit 370 analyzes the feature vector space 350 to identify one or more other feature vectors that satisfy a criterion with respect to the mapped feature vector. For instance, by one embodiment, the processing unit 370 may be configured to identify one or more feature vectors, wherein a distance (e.g., hamming distance) of each of the one or more feature vectors with respect to the mapped feature vector is less than a predetermined threshold value. It must be appreciated that if two feature vectors are disposed in close vicinity of one another in the feature vector space (i.e., the hamming distance between the two vectors is small), then the images corresponding to the two feature vectors are likely to be similar to each other. Accordingly, by one embodiment of the present disclosure, the processing unit 370 identifies top N feature vectors that are located within a certain proximity of the mapped feature vector and transmits the images corresponding to the top N feature vectors to the recommend unit 380. The recommend unit 380 provides the images corresponding to the top N feature vectors to the user as a response to receiving the hand-drawn sketch.

Figure 4:
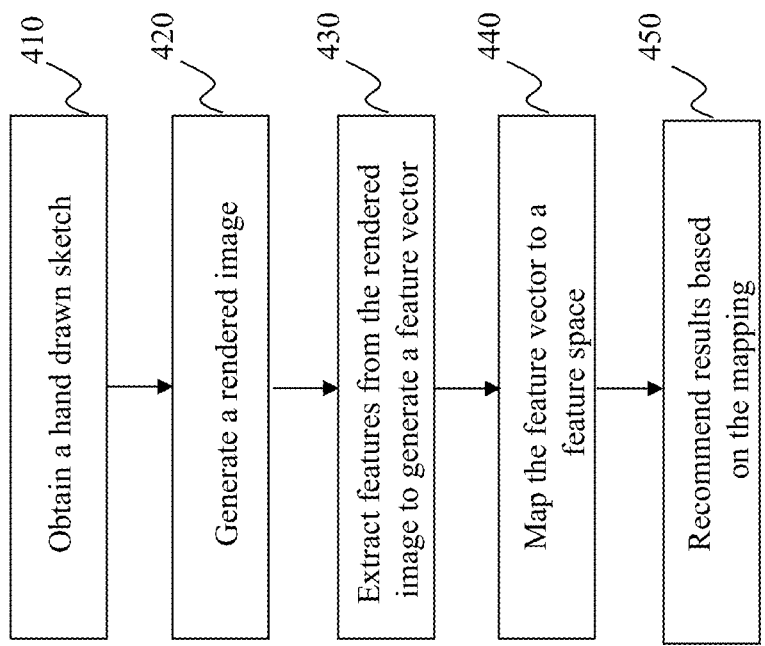
FIG. 4 is a flowchart of an exemplary process performed by a sketch processing unit, according to various embodiments of the present teaching.

FIG. 4 is a flowchart of an exemplary process performed by a sketch processing unit 140, according to various embodiments of the present teaching. The process commences in step 410, wherein a hand-drawn sketch of an object is obtained from a user. Note that as stated previously, the user may utilize an application or a graphical user-interface on a device operated by the user to draw the sketch.

In step 420, a neural network included in the sketch processing unit generates an image (referred to herein as a rendered image) that corresponds to the hand-drawn sketch of the object. The process then moves to step 430, wherein features are extracted from the rendered image in accordance with an extraction model to generate a feature vector. In step 440, the generated feature vector is mapped in a feature vector space. Further, in step 450, based on the mapping, one or more images are recommended to the user.

Figure 5:
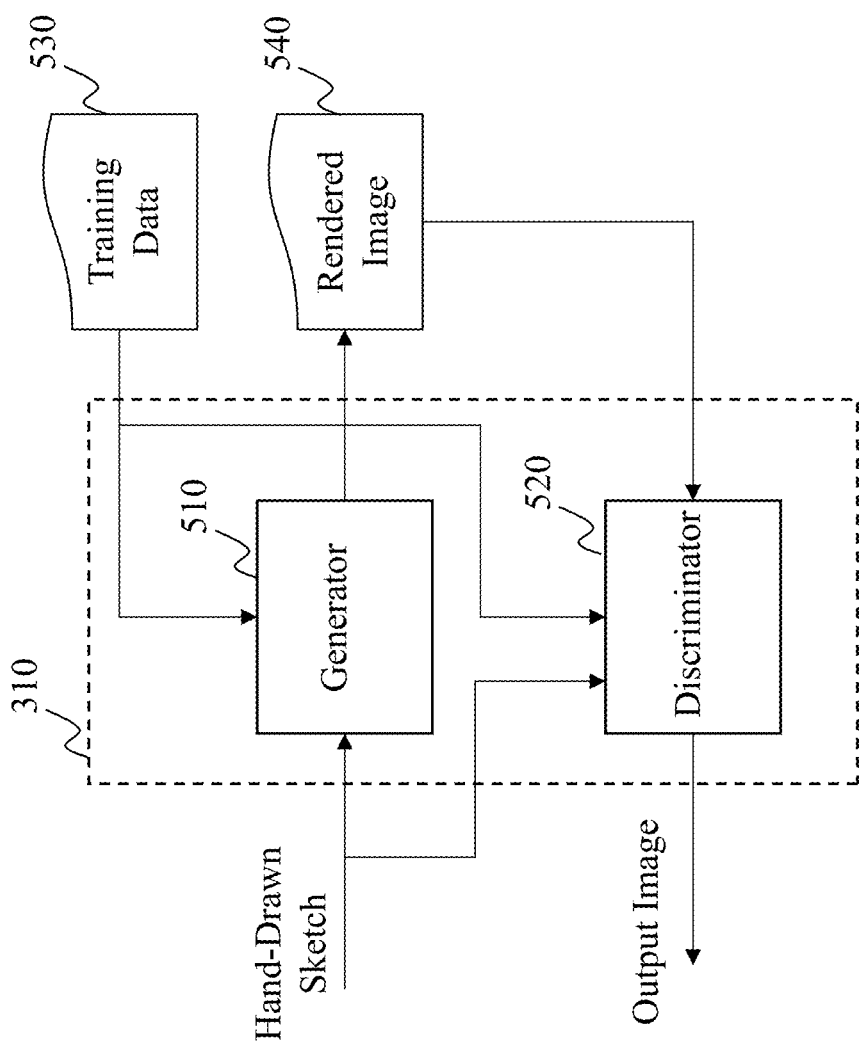
FIG. 5 depicts an exemplary system diagram of a neural network, according to various embodiments of the present teaching.

Turning now to FIG. 5, there is depicted an exemplary system diagram of a neural network 310, according to various embodiments of the present teaching. The neural network 310 included in the sketch processing unit 140 is a conditional generative adversarial network (cGAN). By one embodiment, the cGAN includes two neural networks: a generator 510 and a discriminator 520. Both the generator network 510 and the discriminator network may be trained with training data 530. The details regarding the generator network 510 and the discriminator network 520 are described later with reference to FIGS. 7 and 8, respectively.

The neural network is referred to as adversarial because of a competitive behavior of the two networks. Specifically, the generator 510 attempts to create random synthetic outputs (for instance, images of faces), while the discriminator attempts to tell these apart from real outputs (e.g., a database of celebrities). In training such a generator and discriminator networks, it is hoped that as the two networks compete with one another and are trained with sufficient amount of training data, both the networks will get better i.e., the end result being a generator network that produces realistic outputs.

As shown in FIG. 5, a hand-drawn sketch is input to the generator 510. The generator outputs a rendered image, which corresponds to the hand-drawn sketch. The discriminator network receives as input, the hand drawn sketch and the rendered image 540 and processes the input to validate the rendered image 540. For example, the discriminator 520 may assign a value (e.g. between 0 to 1) to the rendered image, wherein a higher assigned value indicates that the rendered image is a true real image.

Figure 7:
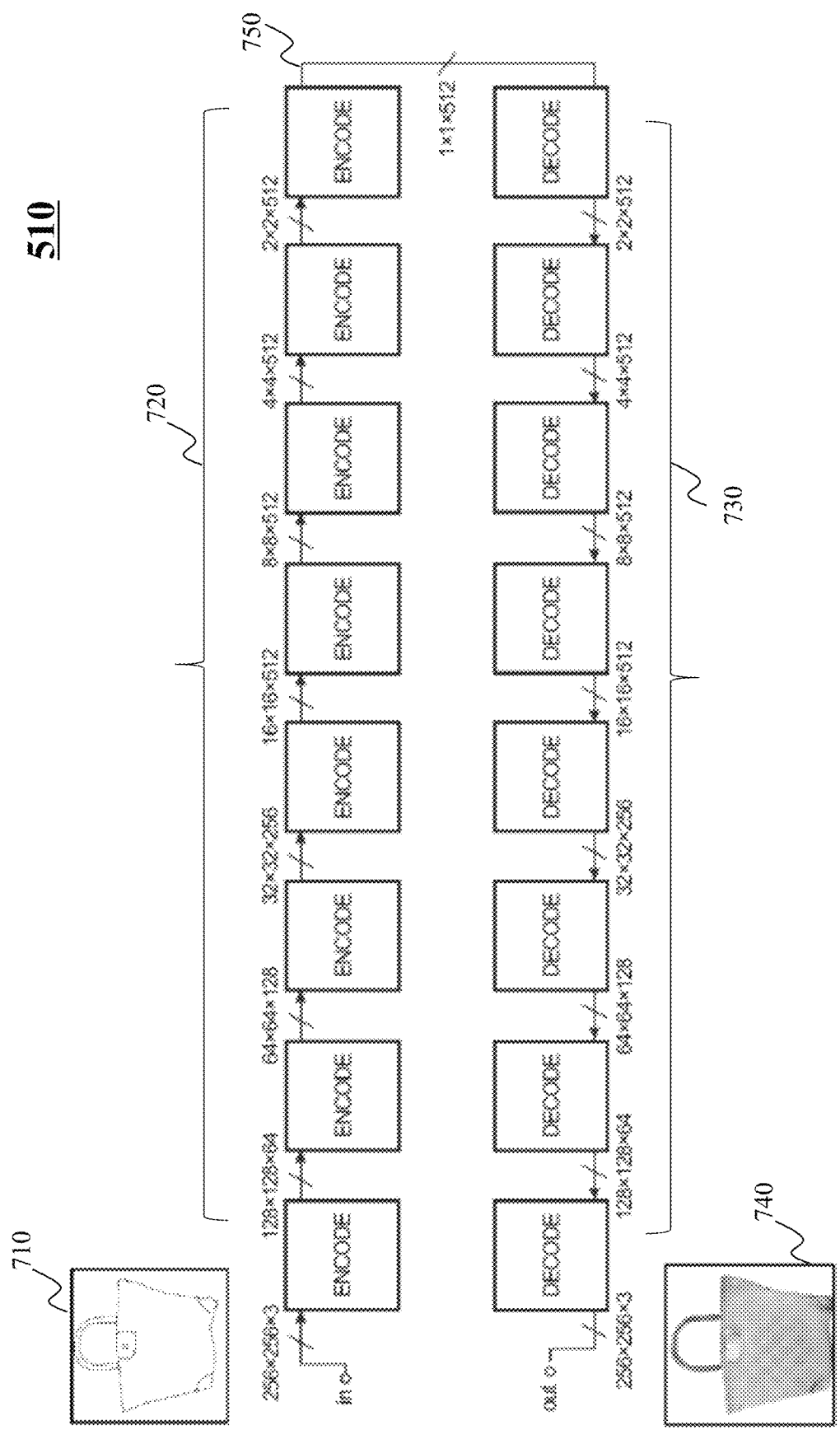
FIG. 7 depicts an exemplary system diagram of a generator network, according to various embodiments of the present teaching.

Turning to FIG. 7, there is depicted an exemplary system diagram of a generator network 510, according to various embodiments of the present teaching. The generator network 510 includes a plurality of encoders 720 and a plurality of decoders 730. Specifically, as shown in FIG. 7, the plurality of encoders and the plurality of decoders are each arranged in a serial fashion, wherein the output of the plurality of encoders is input to the plurality of decoders.

By one embodiment, the plurality of encoders includes a bank of 8 encoders arranged in a serial manner. The hand-drawn sketch 710 is input to a first encoder of the plurality of encoders 720. As shown in FIG. 7, the hand drawn sketch 710 may be of dimensions (x, y, z) i.e., 256×256×3, wherein the parameters x, y, z correspond to a width, a height, and an RGB content of the hand-drawn sketch. As shown in FIG. 7, the hand-drawn sketch 710 is sequentially encoded by the bank of encoders 720 (i.e., perform convolution operation by the eight encoders in the present example) to generate a 512 dimensional code 750. The generated code 750 is input to a first decoder of the plurality of decoders 720. A deconvolution operation is sequentially performed on the generated code by the plurality of decoders 720 to obtain a rendered image 740.

Figure 8:
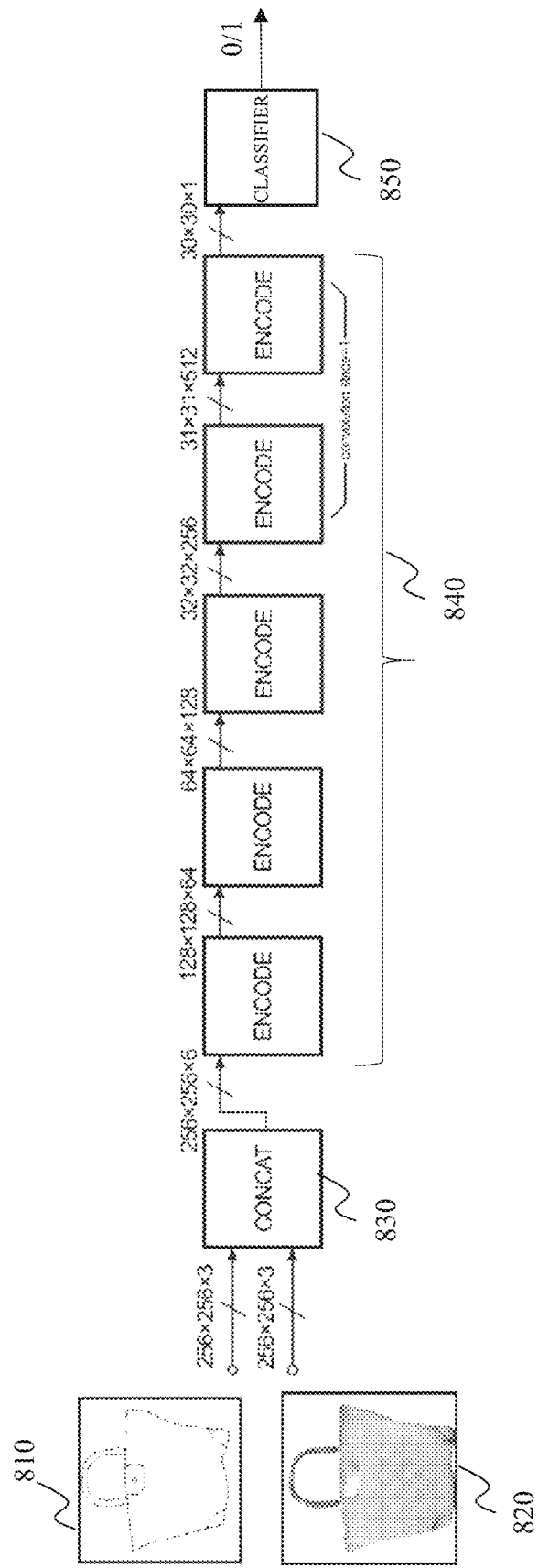
FIG. 8 depicts an exemplary system diagram of a discriminator network, according to various embodiments of the present teaching.

FIG. 8 depicts an exemplary system diagram of a discriminator network 520, according to various embodiments of the present teaching. The discriminator network 520 includes a concatenating unit 830, a plurality of encoders 840 arranged in a serial manner, and a classier 850.

The concatenating unit 830 receives as input the hand-drawn sketch 810 and the rendered image 820 (generated by the generator network 510). The concatenating unit 830 is configured to concatenate (i.e., place next to each other) the hand-drawn sketch 810 and the rendered image 820 and process the concatenated images via the plurality of encoders 840 (i.e., perform 5 times convolution) to obtain a result. By one embodiment, the classifier 850 is configured to assign a value 0 or 1, to indicate validity of the rendered image, wherein 1 corresponds to the rendered image being valid (real) and 0 corresponds to the rendered image being invalid (fake).

Figure 6:
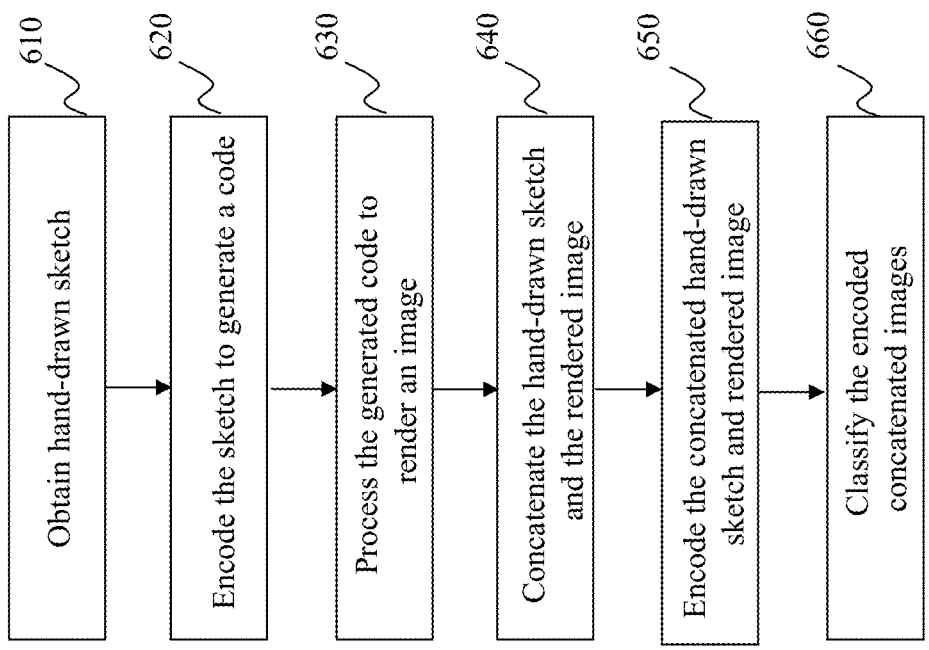
FIG. 6 is a flowchart of an exemplary process performed by a neural network, according to various embodiments of the present teaching.

Turning now to FIG. 6, there is illustrated a flowchart of an exemplary process performed by a neural network, according to various embodiments of the present teaching. The process commences in step 610, wherein a hand-drawn sketch is obtained from a user. In step 620, the obtained hand-drawn sketch is processed by a generator network (of a neural network). Specifically, the obtained image is encoded by a plurality of encoders that are arranged in a serial manner to generate a code.

In step 630, the generated code is processed by a plurality of decoders to obtain a rendered image. The process thereafter moves to step 640, wherein the discriminator network (of the neural network) concatenates the hand-drawn sketch with the rendered image. In step 650, the concatenated hand-drawn sketch and the rendered image are encoded by a plurality of encoders. In step 660, the result of encoding the concatenated images is classified (via a classifier) in order to provide an indication related to the authenticity of the rendered image.

Figure 9:
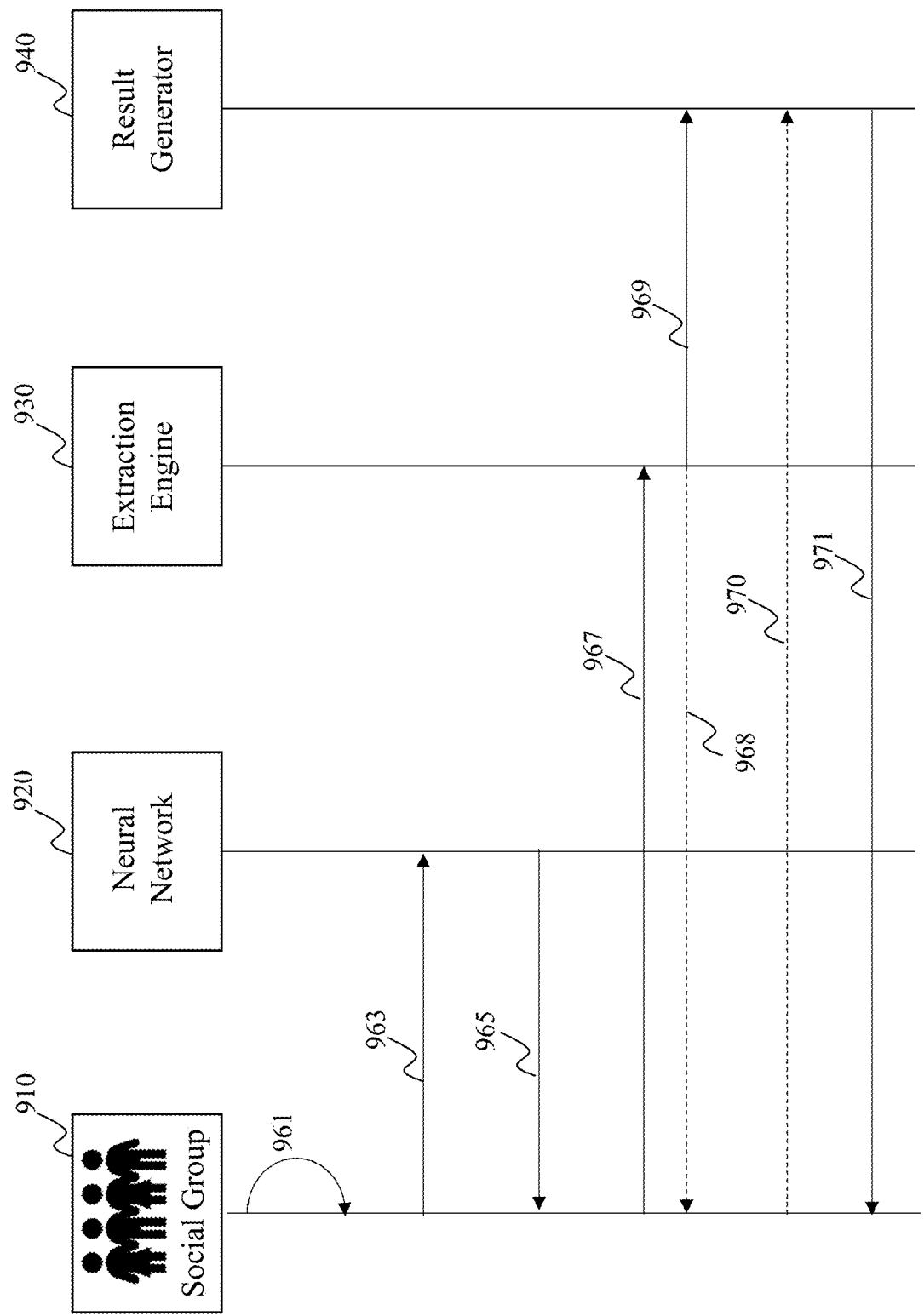
FIG. 9 depicts an exemplary diagram of performing a hand-drawn sketch search, according to an embodiment of the present teaching.

FIG. 9 depicts an exemplary diagram of performing a hand-drawn sketch search, according to an embodiment of the present teaching. The entities involved in the hand-drawn sketch search process include a social group of users 910, a neural network 920, an extraction engine 930, and a result generator 940. The neural network 920, the extraction engine 930, and the results generator 940 may be modules or processing units included in the sketch processing unit described with reference to FIG. 1.

In step 961 a group of users generate a hand drawn sketch of an object. For instance, by one embodiment, a user in the group of users may generate a hand-drawn sketch of the object. The generated sketch may be shared by the user with other users in the group. For example, a sketch may be shared by a user with his friends (i.e., a friends group) on a social networking platform. Further, other users in the group may modify portions of the hand-drawn sketch by the user. Thus, upon completion of step 961 in FIG. 9, a hand-drawn sketch generated by a user or a group of users is obtained.

In step 963, the obtained sketch is transmitted to the neural network 920. By one embodiment, the neural network 920 may be a cGAN. The neural network is configured to receive the hand-drawn sketch of an object and generate an image that corresponds to the hand-drawn sketch. In other words, the neural network receives a rough sketch i.e., a hand-drawn sketch of an object and generates a real world image of the object (also referred to herein as a rendered image). In step 965, the rendered image may be transmitted to the user/group of users for validation purposes. Upon validation, the rendered image is transmitted to the extraction engine (step 967). The extraction engine is configured to extract feature(s) from the rendered image. By one embodiment, the extraction engine may be configured to construct a feature vector based on the extracted features.

By one embodiment, the extracted features may be transmitted to group of users (step 968). In step 969 (and/or step 970), the extracted features and/or the constructed feature vector are transmitted to the result generator 940. By one embodiment, the result generator 940 is configured to identify one or more images stored previously, that have features similar to the one or more extracted features. For example, by one embodiment of the present disclosure, the result generator 940 may be configured to map the feature vector in a feature vector space. Thereafter, the result generator 940 may be configured to identify one or more feature vectors, wherein a distance (e.g., hamming distance) of each of the one or more feature vectors with respect to the mapped feature vector is less than a predetermined threshold value. Accordingly, the result generator 940 may identify top N feature vectors that are located within a certain proximity of the mapped feature vector and retrieve (from a repository) the images corresponding to the top N feature vectors. In step 971, the retrieved one or more images are provided to the group of users in response to receiving the hand-drawn sketch.

Figure 10:
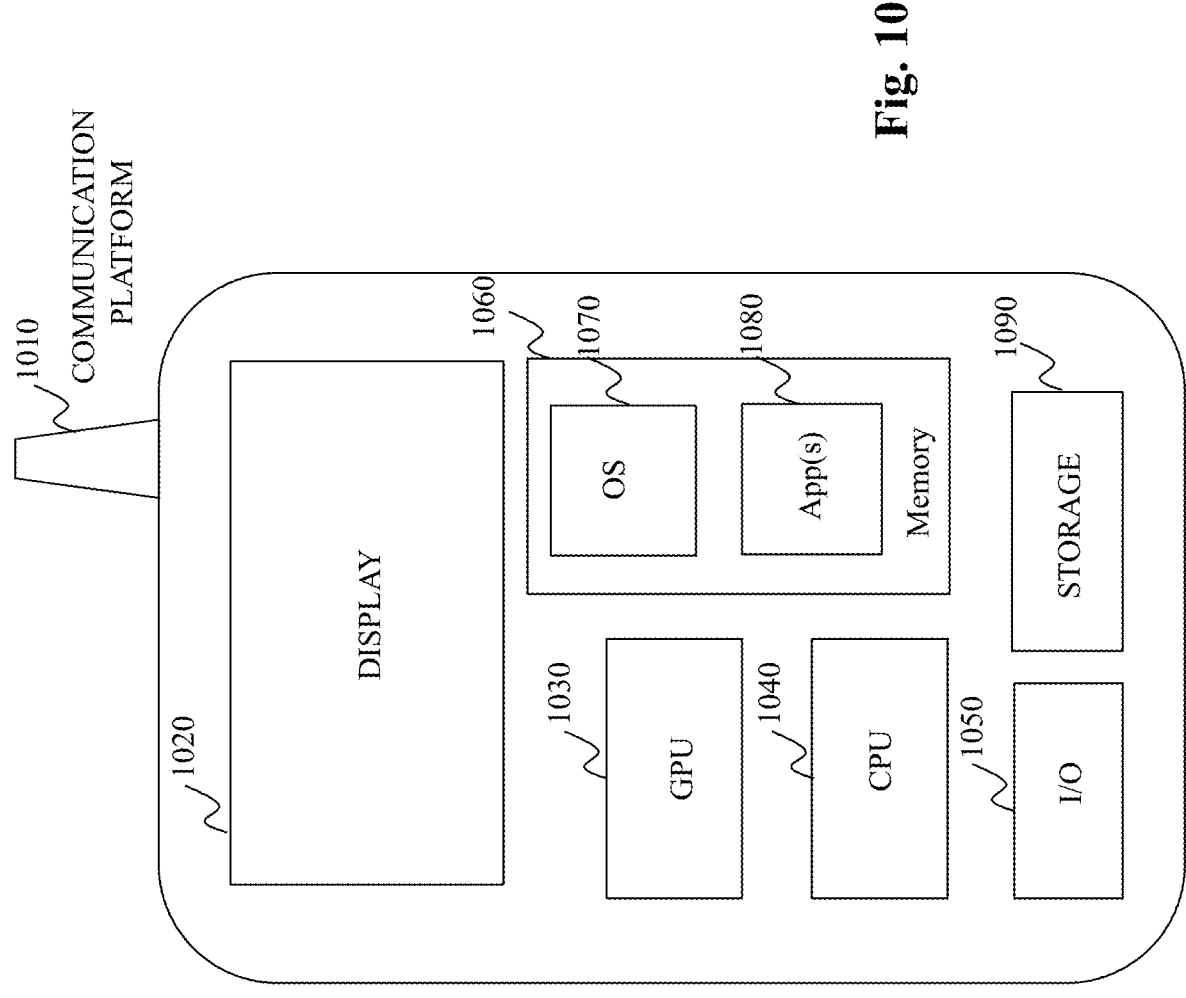
FIG. 10 depicts an architecture of a mobile device which can be used to implement a specialized system incorporating the present teaching.

Turning now to FIG. 10, there is depicted an architecture of a mobile device 1000, which can be used to realize a specialized system implementing the present teaching. In this example, a user device on which the functionalities of the various embodiments described herein can be implemented is a mobile device 1000, including, but not limited to, a smart phone, a tablet, a music player, a handled gaming console, a global positioning system (GPS) receiver, and a wearable computing device (e.g., eyeglasses, wrist watch, etc.), or in any other form factor.

The mobile device 1000 in this example includes one or more central processing units (CPUs) 1040, one or more graphic processing units (GPUs) 1030, a display 1020, a memory 1060, a communication platform 1010, such as a wireless communication module, storage 1090, and one or more input/output (I/O) devices 1050. Any other suitable component, including but not limited to a system bus or a controller (not shown), may also be included in the mobile device 1000. As shown in FIG. 10, a mobile operating system 1070, e.g., iOS, Android, Windows Phone, etc., and one or more applications 1080 may be loaded into the memory 1060 from the storage 1090 in order to be executed by the CPU 1040. The applications 1080 may include a browser or any other suitable mobile apps for performing the various functionalities on the mobile device 1000. User interactions with the content displayed on the display panel 1020 may be achieved via the I/O devices 1050.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 11:
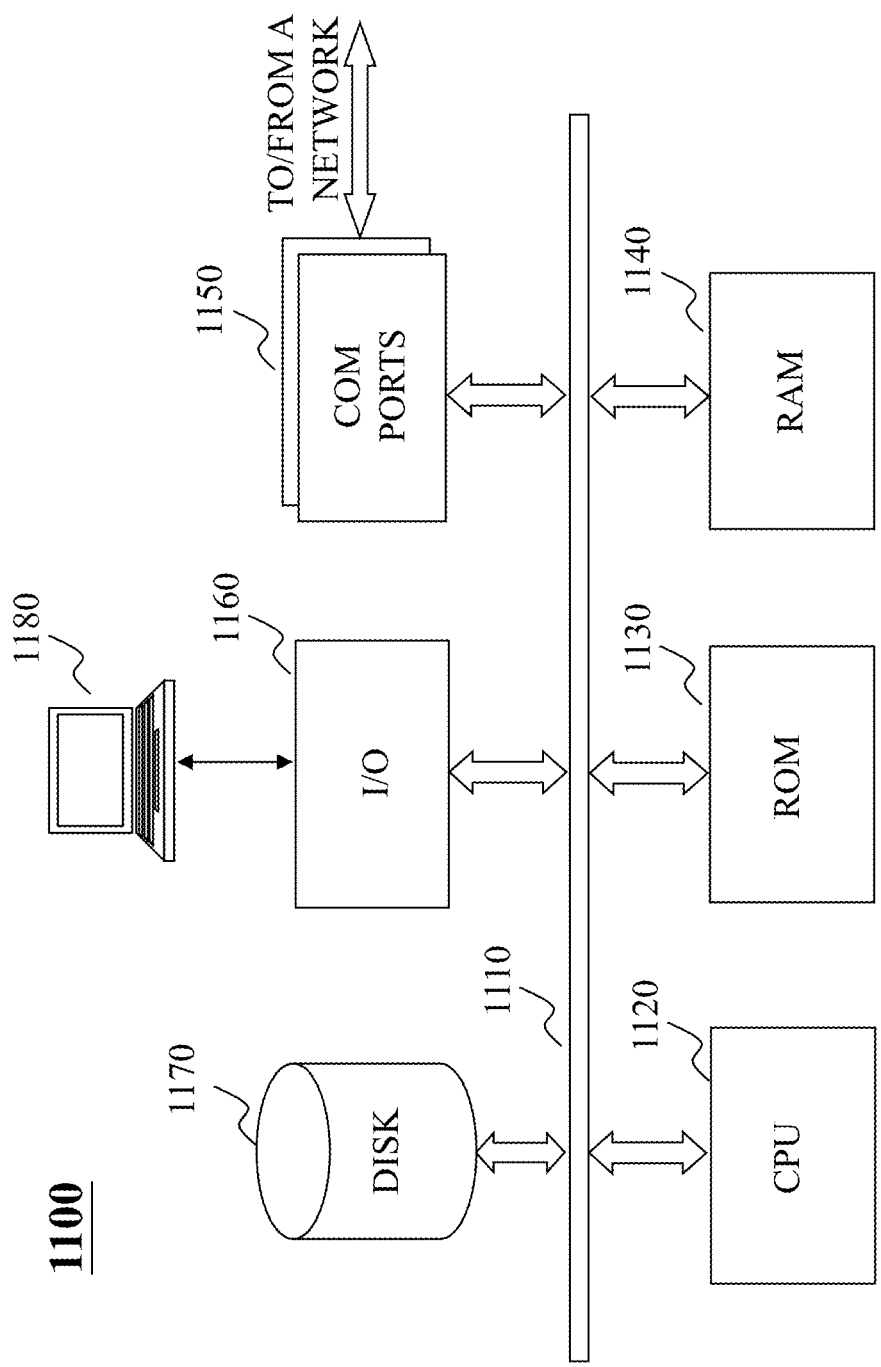
FIG. 11 depicts the architecture of a computer which can be used to implement a specialized system incorporating the present teaching.

FIG. 11 is an illustrative diagram of an exemplary computer system architecture, in accordance with various embodiments of the present teaching. Such a specialized system incorporating the present teaching has a functional block diagram illustration of a hardware platform which includes user interface elements. Computer 1100 may be a general-purpose computer or a special purpose computer. Both can be used to implement a specialized system for the present teaching. Computer 1100 may be used to implement any component(s) described herein. For example, the present teaching may be implemented on a computer such as computer 1100 via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 1100, for example, may include communication ports 1150 connected to and from a network connected thereto to facilitate data communications. Computer 1100 also includes a central processing unit (CPU) 1120, in the form of one or more processors, for executing program instructions. The exemplary computer platform may also include an internal communication bus 1110, program storage and data storage of different forms (e.g., disk 1170, read only memory (ROM) 1130, or random access memory (RAM) 1140), for various data files to be processed and/or communicated by computer 1100, as well as possibly program instructions to be executed by CPU 1120. Computer 1100 may also include an I/O component 1160 supporting input/output flows between the computer and other components therein such as user interface elements 1180. Computer 1100 may also receive programming and data via network communications.

Hence, aspects of the present teaching(s) as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the sketch processing unit into the hardware platform(s) of a computing environment or other system implementing a computing environment or similar functionalities in connection with sketch processing based search. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the sketch processing unit, as disclosed herein, may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform capable of connecting to a network for searching content, the method comprising:
   sharing, via a graphical user interface within a social group, a sketch of an object generated by a first user included in the social group;
   receiving, via the graphical user interface, a modification to the sketch from at least a second user included in the social group;
   encoding the modified sketch to generate a dimensional code reflecting dimensions of the sketch;
   processing the dimensional code by a plurality of decoders to generate an image corresponding to the modified sketch of the object;
   concatenating the modified sketch and the image to generate a concatenated image;
   encoding the concatenated image;
   determining a numeral value indicative of authenticity of the image by classifying the encoded concatenated image;
   extracting, based on the authenticity, one or more features from the image;
   identifying one or more images previously stored that have features similar to the one or more features; and
   providing, on a webpage, the one or more images to the social group.

2. The method of claim 1, wherein the sketch of the object is drawn in the graphical user interface by the first user.

3. The method of claim 2, further comprising:
   receiving, via the graphical user interface, additional modification of the sketch from one or more additional users included in the social group.

4. The method of claim 1, wherein the step of extracting further comprises:
   generating a feature vector based on the one or more features from the image; and
   mapping the feature vector in a feature-vector space, and wherein feature vectors corresponding to the one or more images are disposed within a threshold distance from the feature vector in the feature-vector space.

5. The method of claim 1, wherein the encoding the modified sketch and processing the dimensional code are via a neural network, and wherein the neural network includes a generator and a discriminator, the generator comprising a first plurality of encoders and the plurality of decoders, each of which are arranged in a serial manner, and wherein the discriminator includes a concatenator, a second plurality of encoders, and a classifier.

6. The method of claim 5, wherein the generator is configured to generate the image by sequentially encoding, via the first plurality of encoders, the modified sketch of the object, and sequentially decoding, via the plurality of decoders, an output of the first plurality of encoders.

7. The method of claim 5, wherein the discriminator is configured for
   concatenating, via the concatenator, the modified sketch of the object and the image to generate the concatenated image;
   encoding, via the second plurality of encoders, the concatenated image; and
   classifying, via the classifier, the encoded concatenated image.

8. A machine readable and non-transitory medium having information recorded thereon for searching content, wherein the information, when read by the machine, causes the machine to perform:
   sharing, via a graphical user interface within a social group, a sketch of an object generated by a first user included in the social group;
   receiving, via the graphical user interface, a modification to the sketch from at least a second user included in the social group;
   encoding the modified sketch to generate a dimensional code reflecting dimensions of the sketch;
   processing the dimensional code by a plurality of decoders to generate an image corresponding to the modified sketch of the object;
   concatenating the modified sketch and the image to generate a concatenated image;
   encoding the concatenated image;
   determining a numeral value indicative of authenticity of the image by classifying the encoded concatenated image;
   extracting, based on the authenticity, one or more features from the image;
   identifying one or more images previously stored that have features similar to the one or more features; and
   providing, on a webpage, the one or more images to the social group.

9. The medium of claim 7, wherein the sketch of the object is drawn in the graphical user interface by the first user.

10. The medium of claim 9, further receiving, via the graphical user interface, additional modification of the sketch from one or more additional users included in the social group.

11. The medium of claim 8, wherein the step of extracting further comprises:
    generating a feature vector based on the one or more features from the image; and
    mapping the feature vector in a feature-vector space, and wherein feature vectors corresponding to the one or more images are disposed within a threshold distance from the feature vector in the feature-vector space.

12. The medium of claim 8, wherein the encoding the modified sketch and processing the dimensional code are via a neural network, and wherein the neural network includes a generator and a discriminator, the generator comprising a first plurality of encoders and the plurality of decoders, each of which are arranged in a serial manner, and wherein the discriminator includes a concatenator, a second plurality of encoders, and a classifier.

13. The medium of claim 12, wherein the generator is configured to generate the image by sequentially encoding, via the first plurality of encoders, the modified sketch of the object, and sequentially decoding, via the plurality of decoders, an output of the first plurality of encoders.

14. The medium of claim 12, wherein the discriminator is configured for
    concatenating, via the concatenator, the modified sketch of the object and the image to generate the concatenated image;
    encoding, via the second plurality of encoders, the concatenated image; and
    classifying, via the classifier, the encoded concatenated image.

15. A system for searching content, the system comprising:
- a graphical user interface implemented by a processor and configured to
  - share, within a social group, a sketch of an object generated by a first user included in the social group, and
  - receive a modification to the sketch from at least a second user included in the social group;
- a neural network implemented by the processor and configured to
  - encode the modified sketch to generate a dimensional code reflecting dimensions of the sketch,
  - process the dimensional code by a plurality of decoders to generate an image corresponding to the modified sketch of the object,
  - concatenate the modified sketch and the image to generate a concatenated image,
  - encode the concatenated image, and
  - determine a numeral value indicative of authenticity of the image by classifying the encoded concatenated image,
- a feature extractor implemented by the processor and configured to extract, based on the authenticity, one or more features from the image; and
- a processing unit implemented by the processor and configured to
  - identify one or more images previously stored that have features similar to the one or more features, and
  - provide, on a webpage, the one or more images to the social group.

16. The system of claim 15, wherein the sketch of the object is drawn in the graphical user interface by the first user.

17. The system of claim 16, wherein the sketch is further modified by one or more additional users included in the social group.

18. The system of claim 15, wherein the feature extractor is further configured to
- generate a feature vector based on the one or more features from the image; and
- map the feature vector in a feature-vector space, and wherein feature vectors corresponding to the one or more images are disposed within a threshold distance from the feature vector in the feature-vector space.

19. The system of claim 15, wherein the encoding the modified sketch and processing the dimensional code are via the neural network, and wherein the neural network includes a generator and a discriminator, the generator comprising a first plurality of encoders and the plurality of decoders, each of which are arranged in a serial manner, and wherein the discriminator includes a concatenator, a second plurality of encoders, and a classifier.

20. The system of claim 18, wherein the generator is configured to generate the image by sequentially encoding, via the first plurality of encoders, the modified sketch of the object, and sequentially decoding, via the plurality of decoders, an output of the first plurality of encoders.

* * * * *